PHILLIPS, SOUTHWICK & ARNOLD.
Car Starter.
No. 70,114. Patented Oct. 22, 1867.
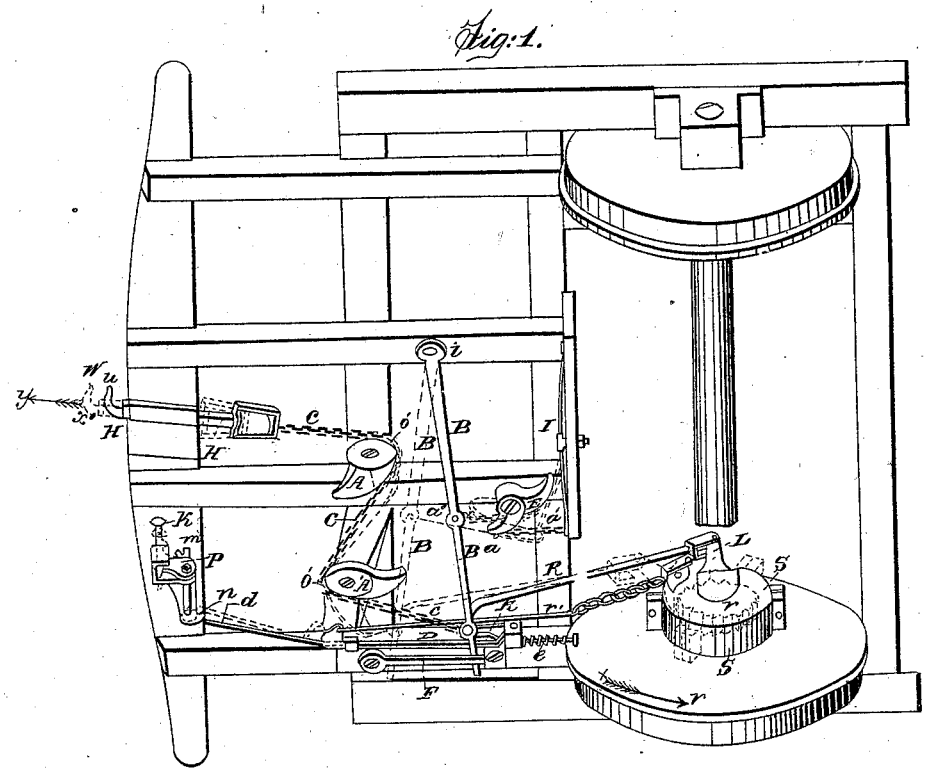
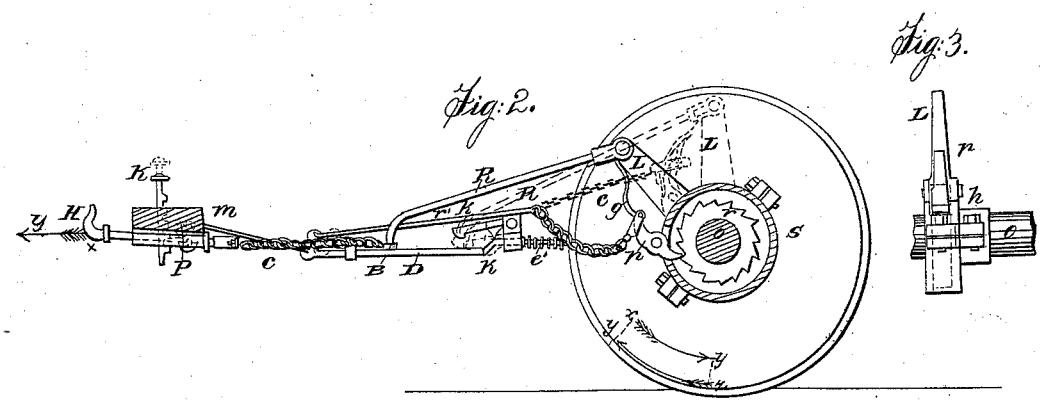
Witnesses
Inventors

United States Patent Office.

JOB PHILLIPS, DANIEL W. SOUTHWICK, AND DAVID A. ARNOLD, OF PAWTUCKET, RHODE ISLAND.

Letters Patent No. 70,114, dated October 22, 1867.

IMPROVEMENT IN STARTING AND STOPPING CARS.

The Schedule referred to in these Letters Patent and making part of the same.

TO ALL WHOM IT MAY CONCERN:

Be it known that we, JOB PHILLIPS, DANIEL W. SOUTHWICK, and DAVID A. ARNOLD, all of Pawtucket, in the county of Providence, and State of Rhode Island, have invented a new and useful improvement "in the means for overcoming the inertia of a railroad car or like body, which is to be transferred from a state of rest to one of motion, without causing shock or sudden strains to the car itself or its motor;" and we do hereby declare that the following is a full, clear, and exact description of the construction and operation of the same, reference being had to the annexed drawings, making a part of this specification.

Figure 1 is a perspective view of the parts of my invention as seen from beneath the car, and are shown in their ordinary position, which is either when the car is in a state of rest or when it has attained its usual rate of motion, and it also shows, in red outline, the relative position to which these parts move in communicating motion to the car.

Figure 2 is a side elevation, showing the position assumed by the several parts when communicating motion to the car, and also showing, in red outline, the position which they resume when the car attains its usual speed, which position is shown more clearly in fig. 1.

Figure 3 is a view of the lever L, which, through a pawl, $p$, attached to the lever and working the ratchet-wheel $r$, fastened to the shaft, imparts motion to the car-wheel.

The invention which is the subject of this patent has particular reference to that class and combination of devices which are designed to diminish the power required to overcome the inertia of a horse-railroad car, by causing the power to act at the extremity of a lever connected with the axle or wheel. The same result has been heretofore attempted by attaching to the axle of the car a ratchet-wheel, which is worked by a pawl fastened to a lever, having for its fulcrum the axle of the car, the force to start the car being applied to the other end of such lever. Such device, however, and all others involving the same principle, have heretofore proved valueless, for the reason that the advantage thus gained, in overcoming the inertia of the load, is counterbalanced by the shock to the car and strain upon the horses occasioned at the moment that the increased speed of the horses, necessary to the working of the lever relatively to the speed of the car, is arrested by the slower movement of the car when the lever has completed its effective action.

Referring to the accompanying drawings, L is the lever, which is connected to the axle by a hub, $h$, which fits loosely upon the axle. This hub $h$ is enlarged to form a shell, $s$, which encloses a ratchet-wheel, $r$, firmly attached to the car-axle. The pawl $p$ is fastened to the overhanging shell, and communicates the motion of the lever L to the ratchet, and thus to the car-axle and wheel, giving motion to the car.

Now, if the mechanism which transfers the force applied to the coupling or draught-hook H to the extremity of the lever L is such that the distance which the draught-hook H is drawn out equals or bears a constant ratio to the space traversed by the lever L, to which it is connected, and if this space be represented by the length of the arrow drawn in red upon the car-wheel in fig. 2, then, to move the lever that space, the draught-hook H must be drawn out an equal distance, represented by the line $x\,y$; but as the force applied through the given space to the lever L has been communicated by the ratchet-wheel upon the axle to the car-wheel, causing it to revolve, the car has been caused to move over a space proportionate to the radius of the car-wheel and length of the lever L, which length will be represented by $y$–$z$ upon the circumference of the wheel. If this distance which has been traversed by the car be added to the distance $x$–$y$ which the draught-hook H has been drawn out, it will give a total distance, represented by the line $x$–$z$, which has been traversed by the draught-hook H, and, therefore, by the horses attached thereto.

As the spaces represented by $x$–$z$ and $x$–$y$ are traversed in the same time, these lines will also represent the relative velocity of the motive power and the speed of the car. Now, as the space through which the lever acts has been assumed as equal to $x$–$y$, it follows, that after the draught-hook H has been drawn out that distance, its movement, relatively to the car, must cease, and its further movement be identical with that of the car itself; that is to say, the speed of the horses must change, at that instant, from a velocity represented by the lines $x$–$z$ to that represented by the lines $y$–$z$. The obvious result of this change in speed must be a sudden strain or shock to the car, which will react upon the horses, the amount of which shock will be that of a body whose weight is equal to the force exerted by the horses, and moving with a velocity equal to that of the draught-hook H the instant before its motion was arrested.

The object of our invention is to prevent this sudden strain or shock, by diminishing the distance that the draught-hook H must be drawn out, and still obtain the benefit of an increased leverage, applied to the wheel, sufficient to overcome the inertia of the load.

It is well understood that the force required to continue the motion of any body is far less than that necessary to overcome its inertia when in a state of rest, or to place it in that condition in which a force requisite to overcome the friction incident to motion will be sufficient to continue that motion. Therefore, the use of an increased leverage after the movement, when an impulse has been given to the car, is practically of no importance, and the leverage can be quickly reduced to its normal amount, which is the radius of the wheel.

In levers which are used to communicate power, lessening the distance between the moving force and the fulcrum of the lever is followed by a corresponding diminution of space over which the moving force travels as compared with the space over which the object is moved, and its velocity, as compared with that of the object, diminishes in a like ratio. Applying this principle to the purpose to be accomplished, we reduce the distance over which the draught-hook travels relatively to the distance travelled by the car so soon as the inertia of the car has been overcome, in consequence of which the speed at which the draught-hook travels, together with its effective power upon the axle, is diminished proportionally, yet as the inertia has been overcome by the action of the lever, when acting with its most effective force, the resistance incident to continuing the car in motion diminishes in greater proportion than the diminishing power of the lever, and the speed of the car, relatively to that of the draught-hook, is increased, until the speed of both horses and car will coincide, when no appreciable shock will be experienced.

That mechanism that we use to effect the above-mentioned object we have shown in the accompanying drawings, in which like letters indicate the same parts in the several figures.

To the axle of the car-wheel we fasten a ratchet-wheel, $r$. To give motion to the ratchet, and consequently to the axle, we use a lever, L, which, by a hub, $h$, (fig. 3,) is connected with, yet moving freely about, the car-axle $o$. The hub $h$ we enlarge, to form a shell, $s$, which encloses the ratchet-wheel, and has attached to it the arm of the lever L, and also the pawl $p$, which latter, when not used in working the ratchet, is kept from all contact with it by the action of a spring, $g$, fig. 2. It will at once be seen that when, by the means hereinafter described, the pawl $p$ is brought into contact with the teeth of the ratchet, any force applied at the extremity of the lever-arm L must, through the ratchet-wheel and axle, be transferred to the car-wheel, and act upon it with a propelling power as much in excess of that which occurs when acting at the axle as the sum of the lengths of the radius of wheel and the length of lever exceed the radius of the wheel.

To communicate to the lever the force exerted by the horses upon the draught-hook H, we employ a chain, C, passing around cams or eccentrics A A', and connecting with one end of a rod, R, which is pivoted at the other end to the lever L. That the force exerted by the horses may act with undiminished power upon the lever when the car is to be started, those portions of the cams A A' which are in contact with chains, and to which they are fastened at some points, as $o$ $o'$, in the line of contact, described from a centre which is that about which the cams revolve, and, therefore, during the time in which the points of contact of chain and cams lie in that arc, the force will be transmitted in exactly the same manner as if the chain passed around pulleys of the same curvature, that is, with unchanged power and velocity. From the point where this arc ceases we so shape the cams that each new point of contact with the chain, caused by the revolution of the cam incident to the forward movement of the chain, lies at a greater distance from the centre, around which the cam moves, and therefore the chain must move through a space gradually increasing above that of the space through which the points $o$ $o'$ move, so that while the lever L has moved its determined distance $x-y$, the distance traversed by the draught-hook H has been but $w-w$, fig. 1. Also, while the draught-hook H commenced with a relative velocity expressed by $x-y$, by the operation of the cams A A' it has been reduced to zero. As it has previously been shown that this decrease of speed of the draught-hook H, and, consequently, of the horses attached, is not actual but only relative to the car, it follows that the means above described effect the object declared, namely, the application, at the instant of starting, of the entire force exerted by the horses upon a lever greater than the radius of the wheel, and after an impulse has been thus given to the car, steadily decreasing such leverage to or equivalent to the radius of the wheel.

To limit the distance through which the lever L may act, we connect with the rod R, which is connected with lever L, a draw-bar, B, which swings upon a pivot, $i$, at one end, the other end being controlled by a keeper, F, fastened to the framework of the car. When the lever is drawn forward to its proper distance, the bar B assumes the position marked in red outline in fig. 1, and takes the whole strain of the load.

Now, if the car is stopped, with the several parts above described occupying the position shown in red outline, fig. 1, they can be of no avail in starting the car until they are brought back to the position shown in black. To effect this object we use a spring, I, (fig. 1,) which we connect by a chain with one arm of a bent lever, E, and the other arm is connected in a like manner with the draw-bar B. To the arms of the bent lever E we give a form and relative position, (shown in fig. 1,) by which it will be seen that when the bar B has been drawn forward, and the spring I is in its greatest tension, or acting with its greatest power, the lever-arm to which the spring connects has so far revolved that the force of the spring, transmitted through the chain to a point on the extremity of that lever, does not, as at the commencement of its motion, act in a direction tangential to the arc in which that point revolves, but in a direction much nearer the centre of the arc, and therefore its effective force has been reduced in like ratio. To that arm connected with the bar B we give a reversed action, that is, we cause the chain which connects with the bar B to act at its greatest distance from the centre when the spring is at its greatest tension, and lessen that distance as the spring recoils. By these means we effect a nearly uniform action of the spring upon the bar B, and by means of the chain C attached to the bar upon the draught-hook H. Therefore, it will not, in any appreciable degree, affect the varied strain due to the cams A A', but is merely a slight addition to the resistance to be overcome by the horses.

After the ordinary speed has been attained by the car, the removal for a time of the strain upon the draw-bar H from any cause, as the slackening of the horses or the rolling forward of the car, will permit the spring I to return the parts from the position shown in red outline to their first position. Now, unless the parts are fastened in this position, when the strain comes again the draught-hook H will be brought up with a shock by contact with the end of the keeper F; therefore, to obviate this, we fasten to the framework of the car a catch, $k$, which is raised by the bar B in its passage, and, by its gravity, falls over it, and thus prevents the bar from being drawn forward. To raise this catch we use a slide, D, which is bent, as shown in drawing, so that, when drawn forward, it is brought in contact with the projection on the catch, thus lifting it. We also use this same motion of the slide D to operate the pawl $p$, which works the ratchet $r$ upon the car-axle, by using as a connection the rod $r'$ and chain $c$. We operate this slide by connecting a rod, $d$, with a crank, $n$, upon whose shaft is placed a pinion, P, moved by a rack, K, which passes up through the car-frame and projects above the floor, which rack is depressed by the foot of the driver. This rack can be withdrawn when the car moves in the opposite direction, to prevent the accident which would occur if, while in its place, it should be depressed, and the pawl $p$ be brought into contact with the teeth of the ratchet B. To limit the motion of the pinion P, and to keep it in a position favorable to the insertion of the rack, we use a pin, $m$, against which the pinion comes in contact at the end of its motion.

The operation of starting the car is, therefore, as follows: At the signal the driver presses with his foot upon the rack K, thus moving the slide D, which operates to raise the catch $k$, freeing the draw-bar B, and at the same time bringing the pawl $p$ into position to work the ratchet $r$. The horses are started, and the force which they exert being transmitted through the chain C, which passes around the cams A A' and the rod R, acts with a force undiminished except by friction upon the lever, which, through the ratchet $r$ upon the axle, moves the wheel, thus giving an impulse to the car. The power acts through the lever L, but, by the previously explained construction of the cams A A', with a gradual lessened amount, until the position of parts shown in red outline in fig. 1 is reached, when the strain is transferred, by the contact of the bar B with the end of the keeper F, to the draught-hook H.

As the car-wheel still moves forward, but the pawl $p$ remains stationary, the teeth of the ratchet recede from the pawl, thus releasing it, and the spring $g$ forces it away from all contact with the ratchet. The driver now removes his foot from the rack K, when the action of the spring $e$ upon the end of the slide D draws the slide back, and thus permits the catch $k$ to fall back into its usual position. When the car attains its usual speed a slight variation in the relative speed of horses and car will relieve the strain upon the draught-hook H, and the spring I will act, through the equalizing-lever E, upon the bar B, and bring all parts connected with the lever to their first position. The bar B, in its passage, raises the catch $h$, which falls back and fastens it, thus affording an unyielding object, upon which the further strain necessary to continue the motion of the car is brought.

We do not intend to limit ourselves to the precise arrangement of the parts as described, but intend to cover all mere formal variations of structure, accomplishing the same mode of operation by equivalent means.

What we claim as our invention, and desire to secure by Letters Patent, is—

1. Combining the draught-hook H with the axle of the car by means of a chain-gear, C, eccentrics A A', and a pawl and ratchet mechanism, substantially as described, for the purposes specified.

2. The combination and arrangement of the slide-rod D, under the control of the driver, with the draw-bar B and holding-catch $k$, substantially as described.

JOB PHILLIPS,
DANIEL W. SOUTHWICK,
DAVID A. ARNOLD.

Witnesses:
 BENJ. F. THURSTON,
 WM. W. RICKARD.